United States Patent Office 3,318,941
Patented May 9, 1967

3,318,941
CHLORO-PHENYLENE-BORATE COMPOUNDS
Richard B. Lund, Whippany, and Arleen C. Pierce, Parsippany, N.J., assignors to Allied Chemical Corporation, New York, N.Y., a corporation of New York
No Drawing. Filed Mar. 6, 1964, Ser. No. 350,078
2 Claims. (Cl. 260—462)

This invention relates to novel chlorine-containing borate compounds and the preparation thereof. More particularly this invention relates to novel borates derived from bisphenol compounds wherein the bisphenolic groups are linked by a tetrachlorobenzene group.

The chlorine-containing borates of the present invention include compounds of the formula:

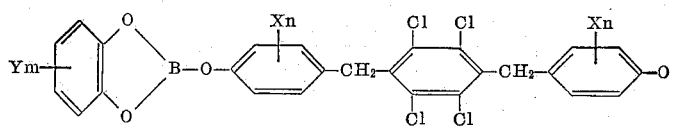

wherein each Y is a substituent independently selected from the group consisting of halogen, alkyl groups which preferably contain 1–4 carbon atoms, and alkoxy groups which preferably contain 1–4 carbon atoms; each X is a substituent independently selected from the group consisting of halogen and alkyl groups which preferably contain 1–4 carbon atoms; $m$ and $n$ are integers of from 0 to 4 and all unspecified valences are satisfied with hydrogen.

The compounds of the present invention may be prepared by reacting $\alpha,\alpha'$-bis(p-hydroxyphenyl)-2,3,5,6-tetrachloroxylene or a substituted derivative thereof with o-phenylene borate, or a derivative thereof substituted on the benzene ring. The resulting chlorinated borates are useful as stabilizers for polymeric compositions and are particularly effective as stabilizers for chlorinated organic compounds.

It is, therefore, an object of the present invention to provide novel chlorine-containing borate compounds and a method for their preparation.

A further object is to provide chlorinated borate compounds which are useful as stabilizers for polymeric compositions.

Additional objects and advantages of the invention will become apparent from the following detailed description thereof.

In accordance with the present invention, chlorinated borates are prepared by the reaction of $\alpha,\alpha'$-bis(p-hydroxyphenyl)-2,3,5,6-tetrachloroxylene or a substituted derivative thereof with o-phenylene borate or a derivative thereof substituted on the benzene ring, as illustrated in the following equation:

wherein X, Y, $m$ and $n$ have the meanings given above. The water formed in the reaction should be removed by distillation or the reaction will not go to completion. Preferably the reaction is carried out in a solvent which azeotropes water and the water is removed by azeotropic distillation at reflux temperature. The solvent used should of course not react with the reactants. In order to avoid an excessively slow reaction rate, the solvent should boil at a temperature of at least 100° C. Particularly good results are obtained when the solvent used is an aromatic hydrocarbon such as toluene, xylene or mesitylene.

The phenylene borate and derivatives thereof used as reactants in the present invention and which are known compounds, can be prepared from boric acid and a dihydric alcohol in accordance with the following equation:

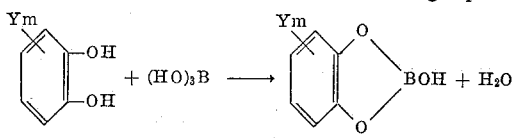

wherein Y and $m$ have the meanings given above. The water formed in this reaction should also be removed by distillation, preferably by azeotropic distillation. It is not necessary to isolate the phenylene borate compound in order to carry out the present invention, but rather after the boric acid and dihydric alcohol have reacted $\alpha,\alpha'$-bis(p-hydroxyphenyl)-2,3,5,6-tetrachloroxylene or a substituted derivative thereof can be added directly to the reaction mixture.

The $\alpha,\alpha'$-bis(p-hydroxyphenyl)-2,3,5,6-tetrachloroxylene and the derivatives thereof used in preparing compounds of the present invention, can be made by reacting a halogenated xylene compound with a phenolic compound in the presence of an acid-activated clay catalyst as illustrated by the following equation:

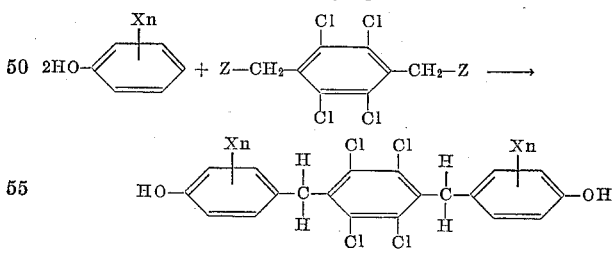

wherein Z is a halogen atom and X and $n$ have the meanings given above. This reaction is described in detail in copending application for United States Letters Patent,

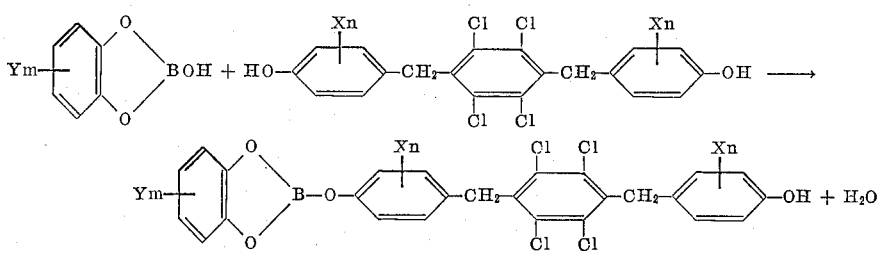

Serial No. 140,220, filed September 25, 1961, now U.S. Patent 3,232,993.

The following compounds are illustrative of the chlorinated borates of the present invention:

α-(4-hydroxyphenyl)-α'-(phenyl)-2,3,5,6-tetrachloroxylene-o-phenylene borate;
α-(3,5-dimethyl-4-hydroxyphenyl)-α'-(3,5-dimethylphenyl)-2,3,5,6-tetrachloroxylene-o-phenylene borate;
α-(4-hydroxyphenyl-2,3,5,6-tetramethyl)-α'-(2,3,5,6-tetramethaylphenyl)-2,3,5,6-tetrachloroxylene-o-phenylene borate;
α-(3,5-dichloro-4-hydroxyphenyl)-α'-(3,5-dichlorophenyl)-2,3,5,6-tetrachloroxylene-o-phenylene borate;
α-(3,5-dibromo-4-hydroxyphenyl)-α'-(3,5-dibromophenyl)-2,3,5,6-tetrachloroxylene-o-phenylene borate;
α-(4-hydroxyphenyl)-α'-(phenyl)-2,3,5,6-tetrachloroxylene-3-methyl-o-phenylene borate;
α-(4-hydroxyphenyl)-α'-(phenyl)-2,3,5,6-tetrachloroxylene-3-methoxy-o-phenylene borate, and
α-(4-hydroxyphenyl)-α'-(phenyl)-2,3,5,6-tetrachloroxylene-3-chloro-o-phenylene borate.

The above listed compounds are given only for illustrative purposes and it will be obvious that many additional compounds are within the scope of the invention.

The compounds of the present invention can be used as stabilizers for chlorinated organic compounds, such as chlorinated polyethylene. When used as stabilizers, the chlorine-containing borates of this invention should be added to the polymer in an amount equal to at least 0.5 percent by weight of the polymer and preferably in amount equal to 1.0–10% by weight of the polymer.

In a typical example it was found that the addition to chlorinated polyethylene of 4% by weight of α-(3,5-dimethyl - 4 - hydroxyphenyl) - α' - (3,5 - dimethylphenyl)-2,3,5,6-tetrachloroxylene-o-phenylene borate substantially decreased the crosslinking of the polymer on treatment at 200° C. for one hour.

The following example is given to further illustrate the invention but it is to be understood that the invention is not to be limited in any way by the details described therein.

EXAMPLE 27.2 parts by weight catechol were refluxed with 15.5 parts by weight boric acid in xylene until the theoretical amount of water was collected in a Dean-Stark trap. To this reaction mixture there were added 47.8 parts by weight α,α' - bis(4 - hydroxy - 3,5 - dimethylphenyl) - 2,3,5,6-tetrachloroxylene, and the refluxing was continued until an additional 1.8 parts by weight water were collected in the Dean-Stark trap. The solid thus formed was recrystallized from benzene, yielding a product having a melting point of 240–255° C. This product was confirmed to be α-(3,5-dimethyl-4-hydroxyphenyl)-α'-(3,5-dimethylphenyl)-2,3,5,6-tetrachloroxylene-o-phenylene borate by its infrared spectrum.

It will be apparent that many modifications and variations may be effected without departing from the scope of the novel concepts of the present invention, and the illustrative details disclosed are not to be construed as imposing undue limitations on the invention.

We claim:
1. A compound having the formula:

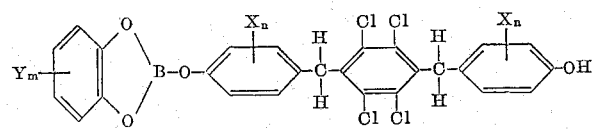

wherein each Y is a substituent independently selected from the group consisting of chlorine, lower alkyl and alkoxy; each X is a substituent independently selected from the group consisting of chlorine, bromine and lower alkyl; $m$ and $n$ are integers of from 0 to 4 and all unspecified valences are satisfied with hydrogen.

2. α - (3,5 - dimethyl - 4 - hydroxyphenyl) - α' - (3,5-dimethylphenyl) - 2,3,5,6 - tetrachloroxylene - o - phenylene borate.

References Cited by the Examiner
UNITED STATES PATENTS 2,994,713  8/1961  Lane _____ 260—462

CHARLES B. PARKER, *Primary Examiner.*

DELBERT R. PHILLIPS, *Assistant Examiner.*